United States Patent
Navé et al.

(10) Patent No.: US 7,397,993 B1
(45) Date of Patent: Jul. 8, 2008

(54) FIBER OPTIC RIBBONS HAVING AN ATTACHMENT PORTION

(75) Inventors: Samuel Don Navé, Newton, NC (US); Todd Ray Rhyne, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/731,399

(22) Filed: Mar. 30, 2007

(51) Int. Cl.
*G02B 6/44* (2006.01)
*H01B 7/08* (2006.01)

(52) U.S. Cl. .................. 385/113; 385/111; 385/106; 385/107; 174/117 F (58) Field of Classification Search .......... 385/110–116
See application file for complete search history.

(56) References Cited

U.S. PATENT DOCUMENTS

| | | | | |
|---|---|---|---|---|
| 5,668,912 A | * | 9/1997 | Keller | .................. 385/100 |
| 2001/0015282 A1 | * | 8/2001 | Scantlebury | ............ 174/117 F |
| 2007/0003369 A1 | * | 1/2007 | Hanson et al. | ............... 405/19 |
| 2007/0090231 A1 | * | 4/2007 | MacDuff | ..................... 248/62 |
| 2007/0200034 A1 | * | 8/2007 | Urzua | ....................... 248/68.1 |

FOREIGN PATENT DOCUMENTS

JP          11243625 A    *    9/1999

* cited by examiner

*Primary Examiner*—Frank G Font
*Assistant Examiner*—Eric Wong
(74) *Attorney, Agent, or Firm*—Michael E. Carroll, Jr.

(57) ABSTRACT

Disclosed are fiber optic ribbons having at least one optical fiber and a protective covering such as a matrix material. The fiber optic ribbons include an attachment portion for providing the craft an installation option for securing the same. Specifically, the fiber optic ribbon has a first portion that has at least one optical fiber and an attachment portion. The attachment portion generally extends away from the first portion, thereby providing a portion of the fiber optic structure suitable for receiving a fastener therethrough without damaging the at least one optical fiber or causing undue levels of optical attenuation. Moreover, the fiber optic ribbon may be used by itself if a rugged construction is provided or can further include cable components such as a cable jacket. The fiber optic structures may also have a bulbous first portion for indicating the location of the optical fiber to the craft.

27 Claims, 6 Drawing Sheets

FIG. 21 ature suitable for receiving a fastener therethrough without damaging the at least one optical fiber or causing undue levels of optical attenuation. Moreover, the fiber optic ribbon may be used by itself if a rugged construction is provided or can further include components such as a cable jacket. Additionally, other the fiber optic ribbons can have other variations such as strength members, more than one matrix material, use buffered optical fibers, etc.

FIBER OPTIC RIBBONS HAVING AN ATTACHMENT PORTION

CROSS-REFERENCE TO RELATED APPLICATIONS

The present application incorporates by reference U.S. patent application entitled "FIBER OPTIC STRUCTURES HAVING AN ATTACHMENT PORTION", filed even day herewith with the same inventive entity and assigned to Corning Cable Systems LLC.

FIELD OF THE INVENTION

The present invention relates generally to fiber optic structures such as fiber optic ribbons and fiber optic cables for use in outdoor and/or indoor environments. Specifically, the fiber optic structures include an attachment portion that can receive a fastener, thereby providing the craft an installation option for securing the same.

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data compared with optical waveguides such as optical fiber. Consequently, optical waveguide cables replaced most of the copper cables in long-haul communication network links, thereby providing greater bandwidth capacity for long-haul links. However, most communication networks still use copper cables for drop links on the subscriber side of the central office. In other words, subscribers have a limited amount of available bandwidth due to the constraints of copper cables in the communication network. Stated another way, the copper cables are a bottleneck that inhibit the subscriber from utilizing the relatively high-bandwidth capacity of the optical fiber links.

As optical waveguides such as optical fiber are deployed deeper into communication networks, subscribers will have access to increased bandwidth. But certain obstacles exist that make it challenging, time-consuming, and/or expensive to route optical waveguides/optical cables to the subscriber. As the optical network pushes toward the subscriber, the craft needs solutions that provide quick and reliable installation without requiring special installation techniques. The present invention discloses structures that satisfy this need.

SUMMARY OF THE INVENTION

Disclosed are fiber optic structures having an attachment portion for providing the craft an installation option for securing the same. Specifically, fiber optic structures of the present invention allow the craft the option of securing a fastener through the same without damaging the at least one optical fiber or causing undue levels of optical attenuation.

One aspect of the present invention is directed to fiber optic ribbons. The fiber optic ribbons include at least one optical fiber and a protective covering such as a matrix material. The fiber optic ribbon has an attachment portion for providing the craft an installation option for securing the fiber optic ribbon. Specifically, the fiber optic ribbon has a first portion that has at least one optical fiber therein and an attachment portion. The attachment portion generally extends away from the first portion, thereby providing a portion of the fiber optic structure suitable for receiving a fastener therethrough without damaging the at least one optical fiber or causing undue levels of optical attenuation. Moreover, the fiber optic ribbon may be used by itself if a rugged construction is provided or can further include components such as a cable jacket. Additionally, other the fiber optic ribbons can have other variations such as strength members, more than one matrix material, use buffered optical fibers, etc.

Another aspect of the present invention is directed to fiber optic cables. The fiber optic cables include at least one optical fiber and a protective covering such as a cable jacket. Specifically, the fiber optic structure has a first portion that has at least one optical fiber therein and an attachment portion. The optical fiber may have any suitable configuration such as being a loose optical fiber, a buffered optical fiber, or a portion of a fiber optic ribbon. The attachment portion generally extends away from the first portion, thereby providing a portion of the fiber optic cable suitable for receiving a fastener therethrough without damaging the at least one optical fiber or causing undue levels of optical attenuation. In other embodiments, fiber optic structures cables have a bulbous first portion, thereby indicating the location of the one or more optical fibers to the craft.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain principals and operations of the invention.

DETAILED DESCRIPTION OF THE INVENTION

Reference will now be made in detail to the present preferred embodiments of the invention, examples of which are illustrated in the accompanying drawings. Whenever practical, the same reference numerals will be used throughout the drawings to refer to the same or like parts. The present invention is directed to fiber optic structures having an attachment portion, thereby giving the craft the option to install the fiber optic structure by applying one or more suitable fasteners therethrough without damaging the optical fiber therein. Fiber optic structures according to the present invention include fiber optic ribbons, fiber optic cables, and the like.

Figure 1:
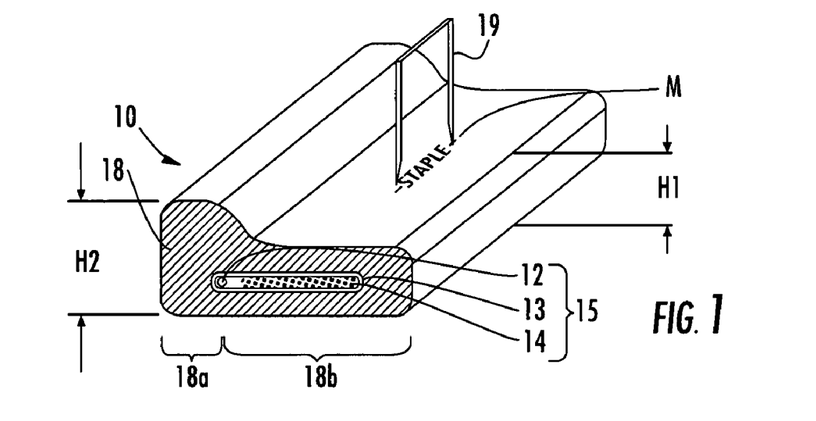
FIG. 1 depicts a perspective view of a fiber optic cable according to the present invention.
Figure 15:
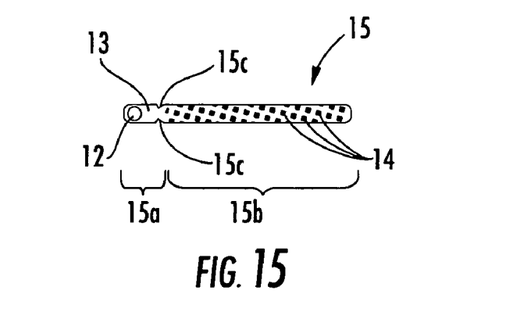
FIGS. 15-19 respectively depict cross-sectional views of fiber optic ribbons according to the present invention.

FIG. 1 depicts an explanatory fiber optic structure configured as a fiber optic cable 10 according to the present invention, which is suitable for fiber to the subscriber applications and the like. Fiber optic cable 10 includes a fiber optic ribbon 15 having a cable jacket 18 applied thereabout. As best shown in FIG. 15, fiber optic ribbon 15 includes a first portion 15a and an attachment portion 15b. Likewise, cable jacket 18 includes a first portion 18a and an attachment portion 18b. As depicted, first portion 18a of cable jacket 18 is generally aligned over the first portion 15a of fiber optic ribbon 15 that includes optical fiber 12, thereby providing a portion of the fiber optic cable that is suitable for receiving a fastener without damaging optical fiber 12 and preserving optical performance. In other words, attachment portion 18b of cable jacket 18 generally extends away from first portion 18a where the optical fiber 12 is located. Extending attachment portion 18b away from optical fiber 12 advantageously isolates the optical fiber from attachment portion 18b, thereby reducing the risk of damaging the optical fiber(s) during installation and preserving optical performance. Consequently, the craft can secure a fastener 19 such as a staple, nail, or the like through attachment portion 18b for quickly and easily securing fiber optic cable 10, but other installation methods are also possible with structures of the present invention. Other variations and/or features of both fiber optic ribbon 15 and/or fiber optic cable 10 according to the concepts of the present invention are discussed herein.

As best depicted in FIG. 15, fiber optic structure 15 is configured as a fiber optic ribbon that includes at least one optical fiber 12, at least one optional strength member 14, and a protective covering 13. First portion 15a of fiber optic ribbon 15 is the portion that includes one or more optical fibers 12 and attachment portion 15b is the remainder that extends away from the first portion 15a. Fiber optic structure 15 has a total width that consists of the sum of a width of the first portion 15a and a width of the attachment portion 15b as represented by the brackets. Generally speaking, the width of the attachment portion 15b is larger than the width of the first portion 15a, thereby providing a portion suitable for securing with a fastener. A width ratio is defined as of the width of the attachment portion to the width of the first portion. The width ratio of the fiber optic ribbon is about 2:1 and greater and larger ratios such as 3:1 and greater, 5:1 and greater, or 10:1 and greater are possible according to the present invention for isolating the optical fibers from the attachment portion.

Strength members 14 of fiber optic ribbon 15 are at least partially disposed within attachment portion 15b, but may also be included within first portion 15a of fiber optic cable 15, if desired. As shown by FIG. 1, the strength members 14 of fiber optic ribbon 15 are generally aligned with attachment portion 18b of fiber optic cable 10. Additionally, other cable embodiments can include strength members 14 in other portions of the fiber optic structure such as coupled with cable jacket 18 or disposed therein. Strength members 14 can include any suitable materials such as fiberglass, aramid fibers, glass-reinforced plastics (GRPs), aramid reinforced plastics (ARPs), polyester, polyethylene, steel wires, combinations thereof or any other suitable materials for providing tensile strength. By way of example, a combination of strength members is used that includes polyester strands intermingled with strands having a tensile strength that is greater than the polyester such as aramid or fiberglass strands. Fiber optic ribbon 15 also includes protective covering 13 such as a matrix material for holding the optical fiber 12 and optional strength members 14 in the fiber optic ribbon. In this fiber optic ribbon, the ribbon matrix material is a UV curable material; however, other suitable materials are possible for use as the matrix material that holds the optical fiber and/or optional strength members. Illustratively, matrix material may be a plastic, a paper, a fabric, a mesh, or a composite of materials. Other explanatory variations of fiber optic ribbons according to the present invention are discussed herein such as in FIGS. 16-19.

Cable jacket 18 uses any suitable material such as a polymer or the like. The width ratio between the attachment portion and the first portion for the fiber optic cable is about 1:1 and greater, which is slightly different from the fiber optic ribbon. Of course, larger ratios such as 2:1 and greater, 5:1 and greater, or 10:1 and greater are possible for the cable jacket according to the present invention, thereby isolating the optical fibers from the attachment portion. Cable jacket materials may also have flame-retardant, low-smoke zero halogen (LSZH), or other suitable characteristics for meeting the desired ratings such as general purpose, riser, plenum, indoor/outdoor, or the like. Suitable materials include polyethylene (PE), polyvinylchloride (PVC), polypropylene (PP), thermoplastic elastomers (TPE), polyurethane (PU), fluoropolymers, flame-retardant polyethylene (FRPE), flame-retardant polypropylene (FRPP), flame-retardant thermoplastic elastomers (FRTPE), flame-retardant polyurethanes (FRPU), blends thereof, or the like. By way of example, the cable jacket could include flame-inhibiting materials or agents such as antimony trioxide, aluminum trihydrate, zinc borate, magnesium hydroxide, or other known materials for meeting the desired rating. Further, cable jacket 18 can also use a material that inherently provides a flame-retardant rating such as PVC, FRPE, FRPP or the like, thereby achieving the desired rating.

Illustratively, fiber optic cables for riser-ratings use a PVC jacket. Examples of suitable materials include PVCs having an limiting oxygen index (LOI) of about 28% or greater such as available from AlphaGary of Leominster, Mass. under the tradenames GW 2337-A or GW 2271 and which provide suitable low-temperature handling or from Georgia Gulf Corporation of Atlanta Ga. under the tradename NAP 16881. Likewise, examples of suitable FRPEs having an LOI of about 35% or greater are available from AlphaGary under the tradename Sentra 8142. For plenum-rated fiber optic cables, the jacket is a PVDF or other suitable materials such as fluoropolymers like FEP, MFA, other fluoropolymer-based compound, or even PVCs that have LOI values of greater than 40% examples of which are available form AlphaGary under the SmokeGuard tradename or from Teknor Apex of Pawtucket, R.I. under the FireGUARD tradename.

As shown, cable jacket 18 of fiber optic cable 10 has a generally flat shape with first portion 18a having a larger height (i.e., a generally bulbous shaped first portion) than attachment portion 18b. Specifically, first portion 18a of cable jacket 18 has a height H2 that is greater than a height H1 of attachment portion 18b; however, other fiber optic cables can have a generally uniform height. Consequently, first portion 18a indicates to the craft which end of fiber optic cable 10 includes optical fiber 12. Additionally, using first portion 18a with a larger height provides a stop edge for inhibiting the craft from putting a fastener into first portion 18a where the optical fiber is located. In other words, the craft can use the raised portion of cable jacket 18 for positioning a staple gun or the like when installing the cable, thereby inhibiting damage to the optical fiber and preserving optical performance. The uneven height also has an aesthetic benefit when installed along baseboards, crown molding, corners, etc.

Attachment portion 18b of fiber optic cable 10 has two generally flat sides (i.e., a uniform thickness) for making attachment easier for the craft, but attachment portion 18b may have other cross-sectional profiles. Fiber optic cable 10 may also further include one or more markings M for indicating the location of the attachment portion for the craft. Suitable markings M include print statements, indentations, grooves, protrusions, etc. In this cable, marking M is a print statement indicating where along the fiber optic cable the craft can secure a fastener. Of course, variations are possible for fiber optic structures according to the present invention.

Typical dimensions for fiber optic structures are about 3-20 millimeters wide with a height of about 0.3-10 millimeters at the attachment portion and possibly a greater height at the first end. The dimensions can vary based on fiber optic structure (cable or ribbon), components within the structure, mechanical requirements, and the like. By way of example, fiber optic ribbon 15 has a width of about 3 millimeters and the width of first portion 15a is about 1 millimeter, which is about one-half the width of attachment portion 15b (about 2 millimeters) with strength members 14 comprised of filaments of polyester and aramid. Fiber optic cable 10 has a height H1 of about 1-2 millimeters, a height H2 of about 2-3 millimeters and a width of about 4-5 millimeters. Fiber optic structures can have other suitable dimensions and/or designs.

For instance, fiber optic structures may include other suitable components such as one or more optional ripcords, armor, flame-retardant tapes that char or resist burning, water-swellable components such as a yarn, thread, tape, and powder. Further, variations of cable components and/or structures are also possible. Illustratively, strength members 14 can include a coating for promoting bonding with the cable jacket such as a thermoplastic material, ethylene-acrylic acid (EAA), ethylene-vinyl acetate (EVA), rubber, or the like.

Figure 2:
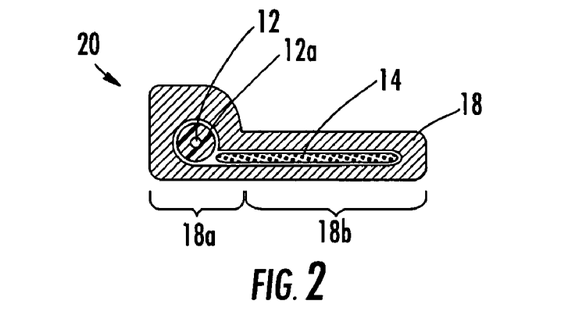
FIG. 2 depicts a cross-sectional view of another fiber optic cable according to the present invention.
Figure 3:
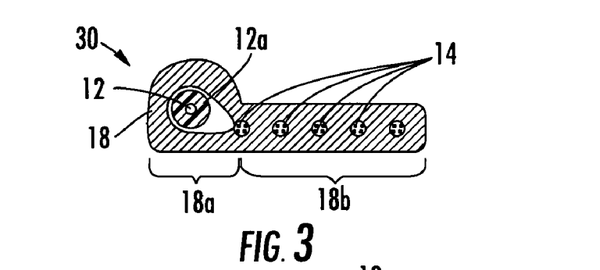
FIGS. 3-14 respectively depict cross-sectional views of other fiber optic cables according to the present invention.
Figure 4:
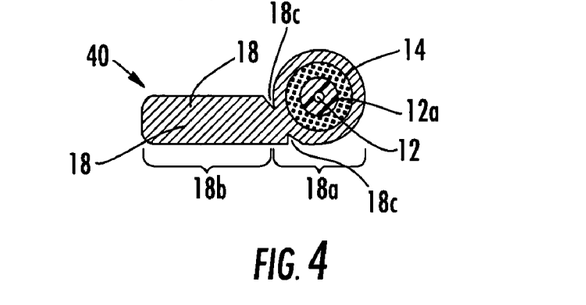

Likewise, fiber optic structures of the invention can package the optical fiber in other ways beside fiber optic ribbon 15 such as one or more loose optical fibers, buffered optical fibers, bundles of optical fibers, conventional ribbons, or the like. Moreover, any suitable type of optical fiber such as multimode, single-mode, bend-performance, etc. may be used. By way of example, FIG. 2 illustrates a fiber optic cable 20 having a single optical fiber and strength members 14 that are disposed within cable jacket 18 that has first portion 18a and attachment portion 18b. As shown in fiber optic cable 20, optical fiber 12 further includes a buffer layer 12a that upcoats the same for added protection. Buffer layer 12a can be any suitable material such as a polymer material, a radiation curable material, or the like. Additionally, strength members 14 are shown disposed and held together as a separate structure from optical fiber 12. Specifically, strength members 14 are held in a coating (not numbered) such as a polymer or the like in a generally flat array that is disposed within a cavity of cable jacket 18; however, strength members 14 could also be disposed loosely within the cavity of cable jacket 18. FIG. 3 depicts a fiber optic cable 30 having strength members 14 that are at least partially bonded with the cable jacket 18 and disposed as separate strands in attachment portion 18b of the structure. Also, different structures can be achieved by using different types of manufacturing processes such as tube-on or pressure extrusion of cable jacket 18. FIG. 4 depicts a fiber optic cable 40 where strength members 14 are disposed about optical fiber 12 having a buffer layer 12a solely within first portion 18a of the same. Simply stated, strength members 14 are arranged about the buffered optical fiber.

Additionally, cable jacket 18 of fiber optic cable 40 includes a plurality of preferential tear portions 18c such as notches in cable jacket 18. Consequently, separation of first portion 18a from attachment portion 18b is easily accomplished for tasks such as connectorization of optical fiber 12. In other words, after separation first portion 18a has a generally round cross-section, thereby making connectorization similar to that used for a conventional round cable. Furthermore, the separated first portion 18a can have a size similar to a standard diameter for a conventional fiber optic cable such as 2.0 millimeters or 2.9 millimeters, but other dimensions are possible.

Figure 5:
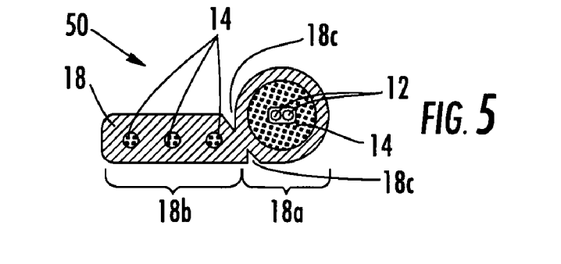

The fiber optic structures may also have embodiments with more than one optical fiber. FIG. 5 depicts a fiber optic cable 50 where optical fibers 12 are a portion of a conventional fiber optic ribbon (not numbered). Specifically, the two optical fibers 12 of fiber optic cable 50 are disposed within a ribbon matrix (not numbered) that connects the optical fibers together. Other embodiments may have other fiber counts for the ribbon and/or have a plurality of ribbons therein. Strength members 14 of fiber optic cable 50 are also include in both first portion 18a and attachment portion 18b. Additionally, cable jacket 18 of fiber optic cable 50 further includes preferential tear portions 18c on the top and/or bottom sides of fiber optic cable 50 for separating attachment portion 18b from first portion 18a of cable jacket 18.

Figure 6:
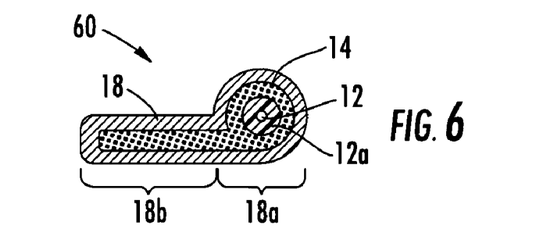
Figure 7:
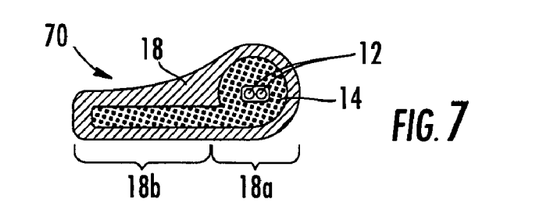

FIG. 6 depicts a fiber optic cable 60 according to the present invention. As depicted, fiber optic cable 60 has strength members 14 that are generally contiguous within cable jacket 18. In other words, strength members 14 are loosely disposed within both attachment portion 18b and first portion 18a and generally surround optical fiber 12 to inhibit cable jacket 18 from tacking to buffer layer 12a during manufacture. Other variations on the shape of the cable jacket and/or the distribution of the strength members are possible. For instance, FIG. 7 depicts a fiber optic cable 70 having optical fibers 12 disposed in a conventional ribbon (not numbered). Like fiber optic cable 60, strength members 14 of fiber optic cable 70 are loosely disposed within both attachment portion 18b and first portion 18a. As shown, cable jacket 18 has a sloping surface along the attachment portion 18b of fiber optic cable 70, thereby making a smooth transition between the portions.

Figure 8:
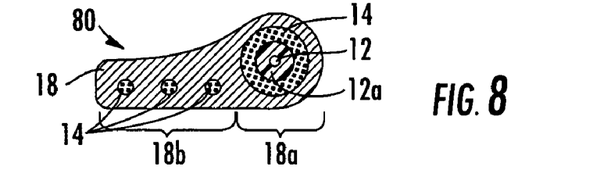
Figure 9:
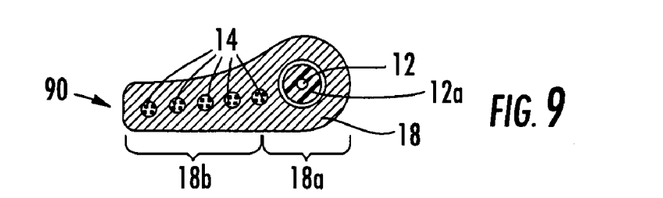
Figure 10:
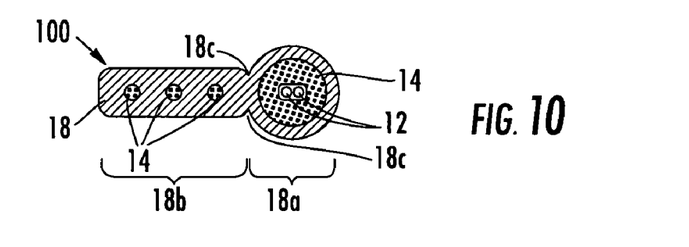

FIGS. 8 and 9 show variations of fiber optic cable 70 having the sloping surface. Both fiber optic cable 80 and fiber optic cable 90 include an optical fiber 12 having a buffer layer 12a instead of the conventional ribbon of fiber optic cable 70. Additionally, fiber optic cable 80 has strength members 14 disposed within the first portion 18a and attachment portion 18b. On the other hand, fiber optic cable 90 has strength members 14 only disposed within attachment portion 18b. For both fiber optic cables 80 and 90, strength members 14 are at least partially bonded with cable jacket 18 and disposed as separate strands within the attachment portion 18b of the structure. FIG. 10 depicts a fiber optic cable 100 that is another variation of cable jacket 18 where attachment portion 18b is generally centered with first portion 18a instead of being disposed to one side to create a generally flat surface. As shown, optical fibers 12 are part of a conventional ribbon (not numbered) and strength members 14 are disposed within both first portion 18a and attachment portion 18b.

Figure 11:
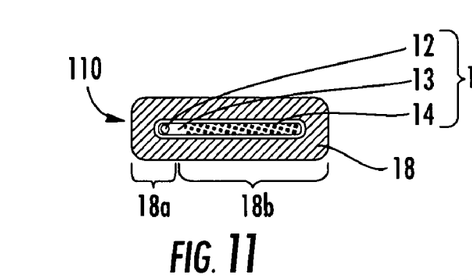
Figure 12:
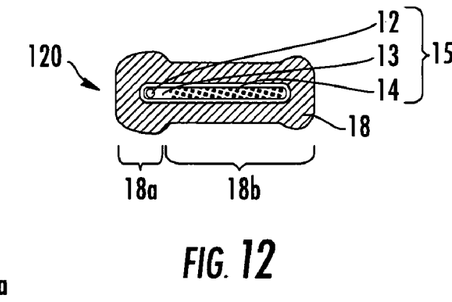

FIGS. 11 and 12 show other embodiments that allow the fastener such as a staple to applied through the attachment portion the fiber optic cable or across the fiber optic cable since the heights at the ends of the fiber optic cable are similar. More specifically, FIG. 11 shows a fiber optic cable 110 having a generally flat cross-section with optical fiber 12 disposed as a portion of fiber optic ribbon 15 as discussed above. Similar to fiber optic cable 10, attachment portion 18b is marked in a suitable manner for identifying where the fastener can be applied through fiber optic cable 110. In other words, the attachment portion of fiber optic ribbon 15 is generally aligned with attachment portion 18b of cable jacket 18 and optical fiber 12 is disposed in first portion 18a. FIG. 12 shows a fiber optic cable 120 having a fiber optic ribbon 15 and cable jacket 18 with a dogbone shape. In other words, cable jacket 18 is thicker at the ends compared with the middle of the cable jacket 18. Thus, this fiber optic cable provides additional crush protection when the fastener is applied across the cable. Fiber optic cable 120 also includes fiber optic ribbon 15 where optical fiber 12 is generally aligned with first portion 18a and attachment portion 18b is suitable for receiving a fastener.

Figure 13:
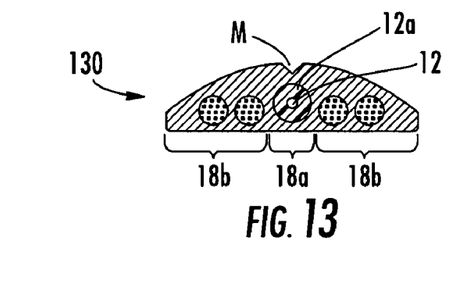
Figure 14:
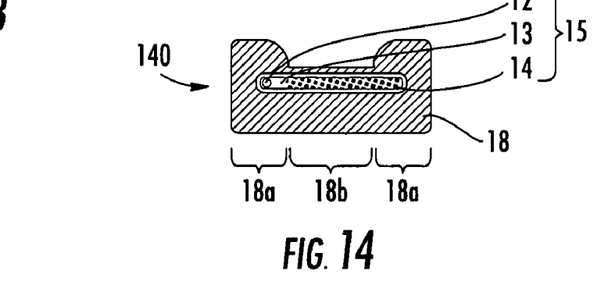

FIG. 13 shows a fiber optic cable 130 having a flat side opposed to a rounded side, thereby producing an aesthetic feature on the rounded side for complementing baseboard trim or the like. Fiber optic cable 130 allows fasteners to be applied across the fiber optic cable or therethrough. Consequently, optical fiber 12 preferably includes buffer layer 12a for aiding crush performance. Unlike the other fiber optic cables, fiber optic cable has optical fiber 12 generally centered within the fiber optic cable. In other words, first portion 18a is disposed in the middle and fiber optic cable 130 has two attachment portions 18b disposed on each side of optical fiber 12. Additionally, each attachment portion 18b has strength members 14 therein. Cable jacket 18 also includes a marking M configured as a notch above optical fiber 12, thereby indicating the position of the same to the craft. Additionally, the notch allows easy access to optical fiber 12 by creating a preferential tear portion in cable jacket 18. Other designs are also possible that allow using fasteners across or through the fiber optic cable. FIG. 14 depicts a fiber optic cable 140 having a 'U'-shaped profile using fiber optic ribbon 15, but other optical fiber arrangements are possible with this design. As shown, cable jacket 18 has a flat bottom and first portions that are thicker than the attachment portion, thereby providing crush support. By way of example, a width of the first portions is about 1 to 2 millimeters wide and the attachment portion is about 1 to 4 millimeters wide, but other sizes are possible. Although fiber optic cable 140 depicts fiber optic ribbon 15 having optical fiber 12 and strength members 14 other variations of this design are advantageous. For instance, with this U-shaped cable jacket optical fibers 12 may be located in each first portion with optional strength members 14 disposed in attachment portion 18b. The optical fibers in each first portion can have any suitable configuration such as buffered, ribbons, etc.

As discussed above, FIG. 15 depicts fiber optic ribbon 15 where optical fibers 12 are disposed on first portion 15a and attachment portion 15b optionally has strength members 14. As desired, fiber optic ribbons of the invention can also use optical fibers having a buffer layer such as UV curable or polymer upcoating such as 500 microns or greater. Also, the detail of FIG. 15 shows that matrix material 13 has preferential tear portions 15c arranged as stress risers between portions for easy separation by the craft. Preferential tear portions can be any suitable structure and/or material. For instance, preferential tear portions can use one or more materials such as a mesh or fabric having a preferential tear direction so that once the tear was started it would propagate in the longitudinal direction of the fiber optic ribbon.

Figure 16:
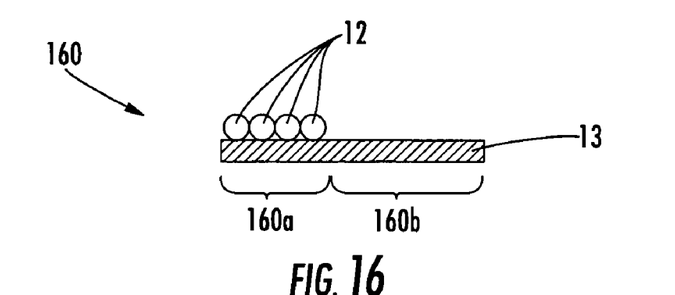

Typical dimensions for a height of fiber optic ribbon are about 0.3-2 millimeters and a width that generally depends on the number of optical fibers therein. Other variations of fiber optic ribbon are possible such as being flame-retardant, LSZH, etc. by using materials inherently having these characteristics or by treating to have these characteristics. Other variations are also possible. For instance, FIG. 16 depicts a fiber optic ribbon 160 having a plurality of optical fibers 12 disposed on matrix material 13 instead of in matrix material.

Figure 17:
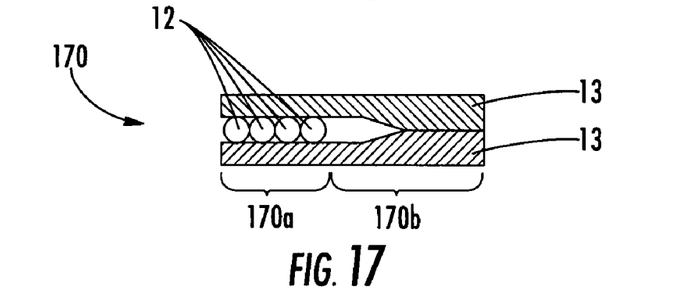

Likewise, FIG. 17 shows a fiber optic ribbon 170 having a plurality of optical fibers 12 disposed between two matrix materials 13 that are attached together. These embodiments can use one or more matrix materials for the structure as discussed above. By example, matrix material 13 of FIG. 16 can be a paper, plastic, etc. having optical fibers 12 attached thereto using means such as adhesive, glue, stitching, hot-melt material, UV curable material, etc. As an example, matrix material may be a plastic film such as Mylar® having optical fibers attached with a hot-melt adhesive, UV curable material, etc. Moreover, the matrix material can be a composite of materials such as a combination of a fabric, a mesh, a paper, a film, and/or a UV curable material etc. to create a preferential tear portion along the length of the fiber optic ribbon.

Figure 18:
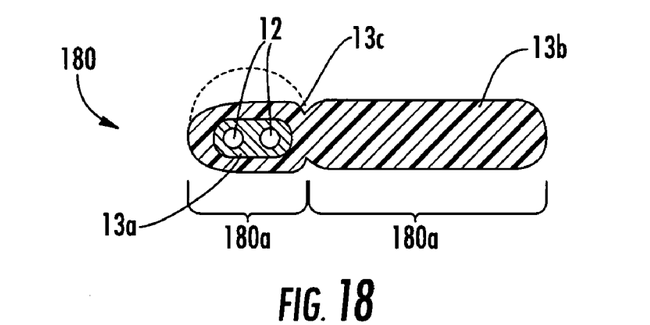

FIG. 18 depicts still another fiber optic ribbon 180 having a dual-layer construction. More specifically, fiber optic ribbon has a plurality of optical fibers 12 disposed in a first matrix material 13a such as a UV curable material, thereby forming an optical subunit (not numbered) disposed within a first portion 180a. Fiber optic ribbon 180 also has a second matrix material 13b that forms attachment portion 180b with preferential tear portion 13c between portions. Like before, the first and second matrix materials can be different or the same. By way of example, one embodiment has first matrix material of UV curable matrix material and the second matrix material is a plastic material, for holding a fastener. Moreover, the construction of this example reduces the amount of UV curable material required for the structure. Of course, if the structure is robust enough it will not require further protection (i.e., no cable jacket is required). As shown by the phantom lines, other variations can include a bulbous first portion for indicating the location of optical fibers 12 within the structure.

Figure 19:
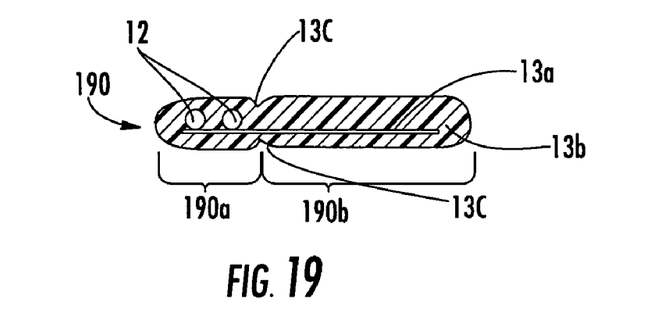

FIG. 19 depicts a fiber optic ribbon 190 using a combination of preferential tear portions. Specifically, fiber optic ribbon 190 includes matrix material 13a which is a mesh, fabric, or the like having a preferential tear direction so that once the tear was started it would propagate in the longitudinal direction of the fiber optic ribbon. Additionally, matrix material 13b uses stress risers such as notches for initiation of the tear in the fiber optic ribbon. Consequently, first portion 190a with optical fibers 12 is separable from attachment portion 190b. Although matrix material 13a is depicted embedded within matrix material 13b other constructions are possible. For instance, matrix material 13a can form a portion of the outer surface of fiber optic ribbon 190.

Figure 20:
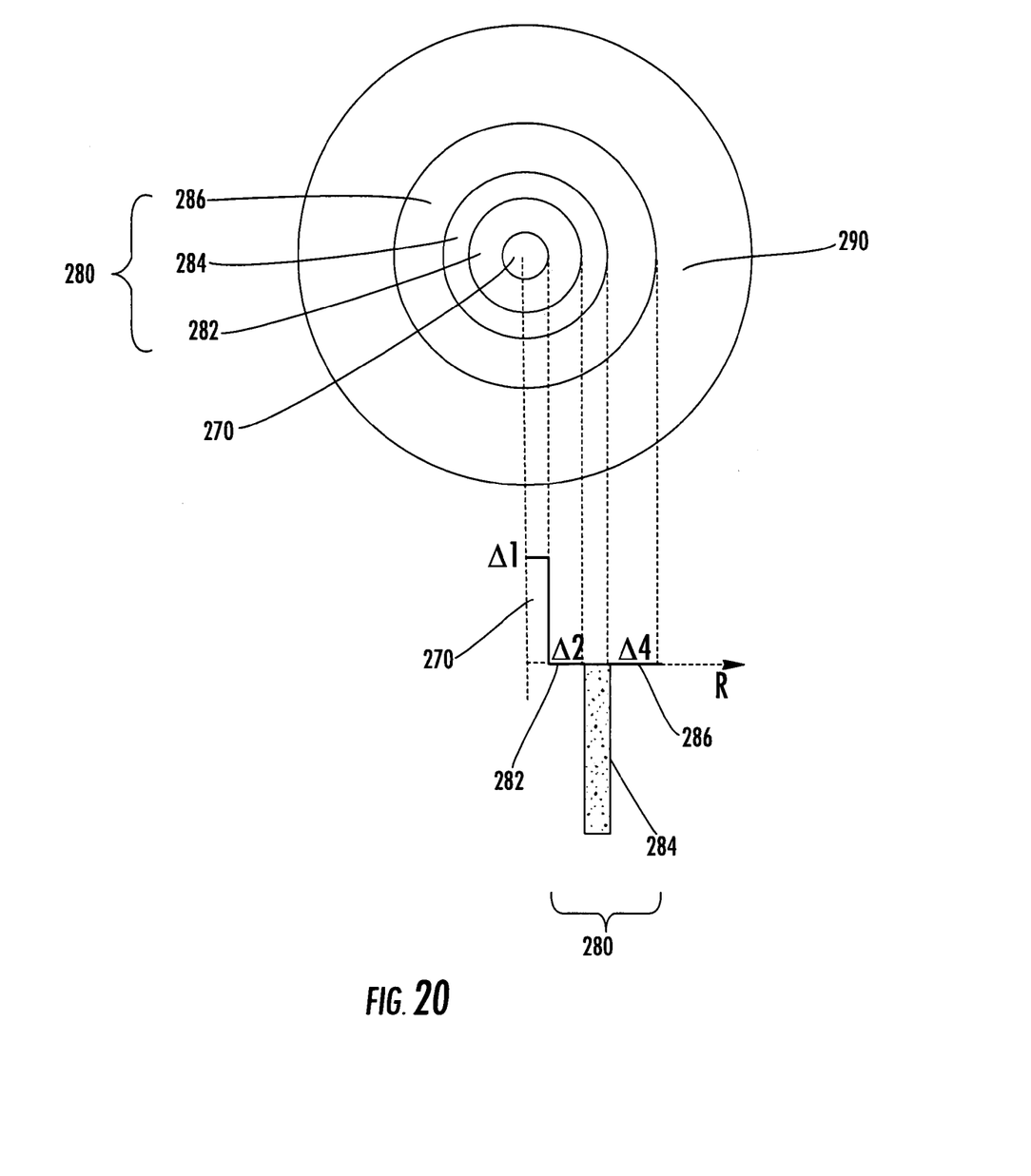
FIG. 20 is a schematic diagram illustrating a cross-section of a bend performance optical fiber operable in accordance with an exemplary embodiment of the present invention.

FIG. 20 depicts a representation of a bend performance optical fiber suitable for use in fiber optic structures of the present invention. The present invention is advantageous with bend performance optical fiber because it permits aggressive bending/installation solutions while optical attenuation remains extremely low. As shown, the bend performance optical fiber is a microstructured optical fiber having a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 microns, more preferably between about 8.0 and 10.0 microns. In preferred embodiments, optical fiber disclosed herein is thus single-mode transmission optical fiber.

In some embodiments, the microstructured optical fibers disclosed herein comprises a core region disposed about a longitudinal centerline, and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

By "non-periodically disposed" or "non-periodic distribution", we mean that when one takes a cross-section (such as a cross-section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 nm, most preferably less than 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fibers disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

In one set of embodiments, the core region includes doped silica to provide a positive refractive index relative to pure silica, e.g. germania doped silica. The core region is preferably hole-free. As illustrated in FIG. 20, in some embodiments, the core region 270 comprises a single core segment having a positive maximum refractive index relative to pure silica $\Delta_1$ in %, and the single core segment extends from the centerline to a radius $R_1$. In one set of embodiments, $0.30\% < \Delta_1 < 0.40\%$, and $3.0 \mu m < R_1 < 5.0 \mu m$. In some embodiments, the single core segment has a refractive index profile with an alpha shape, where alpha is 6 or more, and in some embodiments alpha is 8 or more. In some embodiments, the inner annular hole-free region 282 extends from the core region to a radius $R_2$, wherein the inner annular hole-free region has a radial width W12, equal to R2−R1, and W12 is greater than 1 μm. Radius R2 is preferably greater than 5 μm, more preferably greater than 6 μm. The intermediate annular hole-containing region 284 extends radially outward from R2 to radius R3 and has a radial width W23, equal to R3−R2. The outer annular region 286 extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region 270 and the cladding region 280 are preferably comprised of silica. The core region 270 is preferably silica doped with one or more dopants. Preferably, the core region 270 is hole-free. The hole-containing region 284 has an inner radius R2 which is not more than 20 μm. In some embodiments, R2 is not less than 10 μm and not greater than 20 μm. In other embodiments, R2 is not less than 10 μm and not greater than 18 μm. In other embodiments, R2 is not less than 10 μm and not greater than 14 μm. Again, while not being limited to any particular width, the hole-containing region 284 has a radial width W23 which is not less than 0.5 μm. In some embodiments, W23 is not less than 0.5 μm and not greater than 20 μm. In other embodiments, W23 is not less than 2 μm and not greater than 12 μm. In other embodiments, W23 is not less than 2 μm and not greater than 10 μm.

Such fiber can be made to exhibit a fiber cutoff of less than 1400 nm, more preferably less than 1310 nm, a 20 mm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12 mm macrobend induced loss at 1550 nm of less than 5 dB/turn, preferably less than 1 dB/turn, more preferably less than 0.5 dB/turn, even more preferably less than 0.2 dB/turn, still more preferably less than 0.1 dB/turn, still even more preferably less than 0.05 dB/turn, and a 8 mm macrobend induced loss at 1550 nm of less than 5 dB/turn, preferably less than 1 dB/turn, more preferably less than 0.5 dB/turn, and even more preferably less than 0.2 dB-turn, and still even more preferably less than 0.1 dB/turn.

Figure 21:
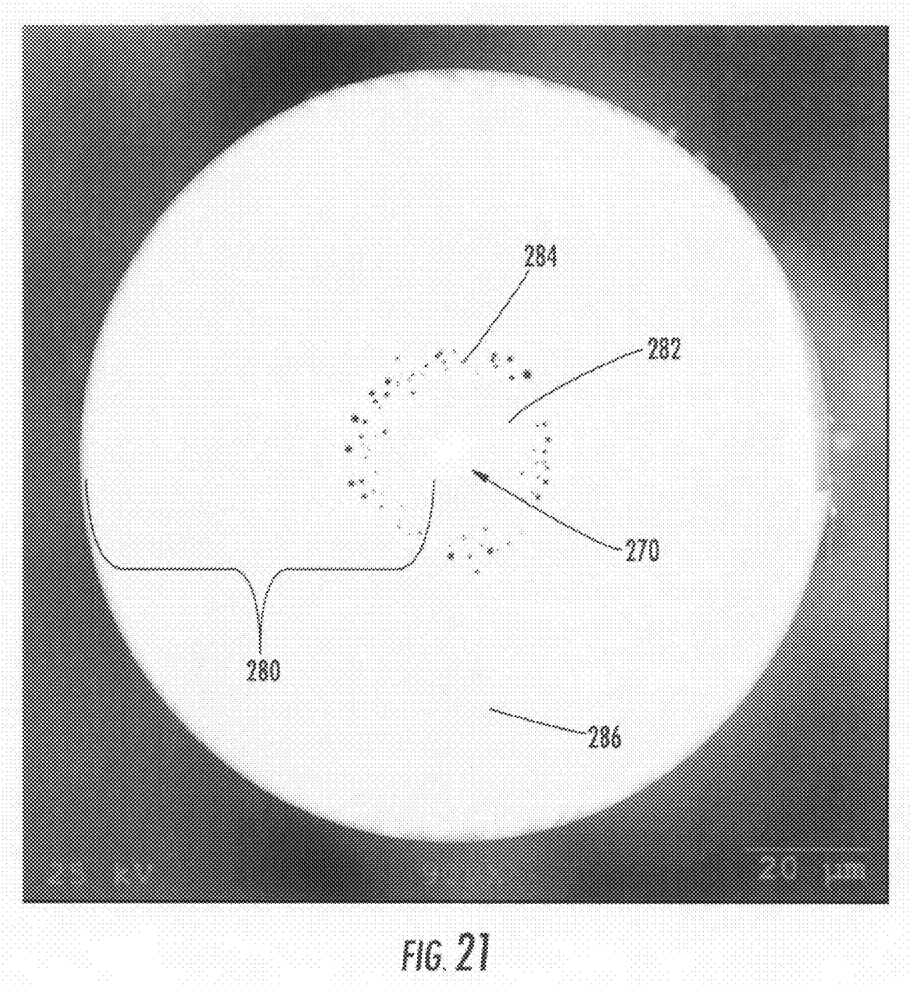
FIG. 21 is a cross-sectional image of a microstructured bend performance optical fiber illustrating an annular hole-containing region comprised of non-periodically disposed holes.

An example of a suitable fiber is illustrated in FIG. 21. The fiber in FIG. 21 comprises a core region that is surrounded by a cladding region that comprises randomly disposed voids which are contained within an annular region spaced from the core and positioned to be effective to guide light along the core region. Other optical fibers and microstructured fibers may be used in the present invention. Additional description of microstructured fibers used in the present invention are disclosed in pending U.S. patent application Ser. No. 11/583, 098 filed Oct. 18, 2006; and, Provisional U.S. patent application Ser. Nos. 60/817,863 filed Jun. 30, 2006; 60/817,721 filed Jun. 30, 2006; 60/841,458 filed Aug. 31, 2006; and 60/841,490 filed Aug. Aug. 31, 2006; all of which are assigned to Corning Incorporated; and incorporated herein by reference.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A fiber optic ribbon comprising:
   at least one optical fiber; and
   at least one matrix material, the at least one matrix material having a first portion that includes the at least one optical fiber and an attachment portion, wherein the attachment portion generally extends away from the first portion, and a width ratio of the attachment portion to the first portion being at least 2:1 or greater, thereby providing a portion of the fiber optic ribbon suitable for receiving a fastener therethrough without damaging the at least one optical fiber, wherein at least one strength member is at least partially disposed within the attachment portion.

2. The fiber optic ribbon of claim 1, wherein the at least one matrix material is selected from the group consisting of a UV curable material, a polymer, a paper, a fabric, a mesh, and a composite material.

3. The fiber optic ribbon of claim 1, wherein the at least one matrix material comprises a first layer and a second layer and the at least one optical fiber is generally disposed between the first layer and the second layer.

4. The fiber optic ribbon of claim 1, wherein the fiber optic ribbon has at least two matrix materials.

5. The fiber optic ribbon of claim 1, wherein the fiber optic ribbon is flame-retardant.

6. The fiber optic ribbon of claim 1, further including a cable jacket thereby forming a fiber optic cable, wherein the fiber optic cable is flame-retardant.

7. The fiber optic ribbon of claim 1, the fiber optic ribbon having a plurality of optical fibers.

8. The fiber optic ribbon of claim 1, the fiber optic ribbon having a preferential tear portion for separating the attachment portion from a first portion of the fiber optic ribbon.

9. The fiber optic ribbon of claim 1, further including a cable jacket, the cable jacket further includes a first portion and an attachment portion and the first portion of the fiber optic ribbon is generally aligned with the first portion of the cable jacket, thereby inhibiting damage to the at least one optical fiber.

10. The fiber optic ribbon of claim 1, further including a cable jacket having a height on the first portion that is greater than a height on the attachment portion.

11. A fiber optic ribbon comprising at least one optical fiber, at least one strength member; and at least one matrix material, the at least one matrix material having a first portion that includes the at least one optical fiber therein and an attachment portion that includes the at least one strength member therein, wherein the attachment portion generally extends away from the first portion, thereby providing a portion of the fiber optic ribbon suitable for receiving a fastener therethrough without damaging the at least one optical fiber; and
   a cable jacket having a first portion and an attachment portion that generally surrounds the fiber optic ribbon, thereby forming a fiber optic cable, wherein the first portion of the fiber optic ribbon is generally aligned with the first portion of the cable jacket, thereby providing a portion of the fiber optic cable suitable for receiving a fastener therethrough without damaging the at least one optical fiber.

12. The fiber optic ribbon of claim 11, a width ratio of the attachment portion to the first portion of the fiber optic ribbon being at least 2:1 or greater.

13. The fiber optic ribbon of claim 11, the cable jacket having a width ratio of an attachment portion to a first portion of at least 1:1 or greater.

14. The fiber optic ribbon of claim 11, wherein the at least one matrix material is selected from the group consisting of a UV curable material, a polymer, a paper, a fabric, a mesh, and a composite material.

15. The fiber optic ribbon of claim 11, wherein the fiber optic ribbon has at least two matrix materials.

16. The fiber optic ribbon of claim 11, wherein the fiber optic ribbon is flame-retardant.

17. The fiber optic ribbon of claim 11, the fiber optic ribbon having a plurality of optical fibers.

18. The fiber optic ribbon of claim 11, the fiber optic ribbon having a preferential tear portion for separating the attachment portion from a first portion of the fiber optic ribbon.

19. The fiber optic ribbon of claim 11, the cable jacket having a preferential tear portion for separating the attachment portion from a first portion of the cable jacket.

20. The fiber optic ribbon of claim 11, the cable jacket having a height on the first end that is greater than a height on the attachment end.

21. A fiber optic ribbon comprising at least one optical fiber and at least one matrix material, the at least one matrix material having a first portion with a bulbous end that includes the at least one optical fiber therein and an attachment portion that is generally flat, wherein the attachment portion includes at least one strength member and generally extends away from the first portion and a width ratio of the attachment portion to the first portion of the fiber optic ribbon being at least 2:1 or greater, thereby providing a portion of the fiber optic ribbon suitable for receiving a fastener therethrough without damaging the at least one optical fiber.

22. The fiber optic ribbon of claim 21, further including a cable jacket having a first portion and an attachment portion that surrounds the fiber optic ribbon, thereby forming a fiber optic cable, wherein the first portion of the fiber optic ribbon is generally aligned with the first portion of the cable jacket, thereby providing a portion of the fiber optic cable suitable for receiving a fastener therethrough without damaging the at least one optical fiber.

23. The fiber optic ribbon of claim 21, further including at least one preferential tear portion.

24. The fiber optic ribbon of claim 21, wherein the fiber optic ribbon is flame-retardant.

25. The fiber optic ribbon of claim 21, further including a cable jacket having a height on the first end that is greater than a height on the attachment end.

26. The fiber optic ribbon of claim 21, wherein the at least one matrix material is selected from the group consisting of a UV curable material, a polymer, a paper, a fabric, a mesh, and a composite material.

27. The fiber optic ribbon of claim 21, wherein the fiber optic ribbon has at least two matrix materials.

* * * * *